United States Patent
Sugaya

(10) Patent No.: US 10,432,894 B2
(45) Date of Patent: Oct. 1, 2019

(54) COMMUNICATION SYSTEM, COMMUNICATION METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/081,089

(22) PCT Filed: Mar. 23, 2016

(86) PCT No.: PCT/JP2016/059111
§ 371 (c)(1),
(2) Date: Aug. 30, 2018

(87) PCT Pub. No.: WO2017/163324
PCT Pub. Date: Sep. 28, 2017

(65) Prior Publication Data
US 2019/0075273 A1    Mar. 7, 2019

(51) Int. Cl.
*H04N 7/14*        (2006.01)
*H04N 21/2187*     (2011.01)
*H04N 21/482*      (2011.01)
*G06K 9/00*        (2006.01)
*H04N 21/4223*     (2011.01)
*H04N 21/472*      (2011.01)
(Continued)

(52) U.S. Cl.
CPC ......... *H04N 7/147* (2013.01); *G06K 9/00362* (2013.01); *G06K 9/00771* (2013.01); *H04N 21/2187* (2013.01); *H04N 21/4223* (2013.01); *H04N 21/4788* (2013.01); *H04N 21/47205* (2013.01); *H04N 21/482* (2013.01); *H04N 21/4821* (2013.01); *H04N 21/8153* (2013.01)

(58) Field of Classification Search
CPC ........................................................ H04N 7/14
USPC ..................................................... 455/404.01
See application file for complete search history.

(56) References Cited

U.S. PATENT DOCUMENTS

| | | | |
|---|---|---|---|
| 2014/0022332 A1* | 1/2014 | Wang | H04M 3/567 |
| | | | 348/14.07 |
| 2014/0125757 A1* | 5/2014 | Lee | H04N 7/141 |
| | | | 348/14.07 |

(Continued)

FOREIGN PATENT DOCUMENTS

| | | |
|---|---|---|
| JP | 2006-14148 | 1/2006 |
| JP | 2006-148737 | 6/2006 |
| JP | 2007-201816 | 8/2007 |

(Continued)

*Primary Examiner* — Maria El-Zoobi
(74) *Attorney, Agent, or Firm* — Lex IP Meister, PLLC

(57) ABSTRACT

The present invention is to provide a system, a method, and a program for communication that is capable to easily select an image from a plurality of images and communicate with a person around the camera that takes the selected image. The system for communication 1 that are connected with a plurality of cameras 300 through a network displays images taken by the plurality of cameras 300, selects a desired image from the displayed images taken by the plurality of cameras 300, and communicates with a person around the camera 300 corresponding to the selected image through a device attached to the camera 300.

16 Claims, 14 Drawing Sheets

(51) Int. Cl.
*H04N 21/4788* (2011.01)
*H04N 21/81* (2011.01)

(56) References Cited

U.S. PATENT DOCUMENTS

2015/0242707 A1* 8/2015 Wilf .................. G06K 9/00302
382/159
2016/0373691 A1* 12/2016 Diao ...................... H04N 7/147

FOREIGN PATENT DOCUMENTS

| JP | 2011-114699 | 6/2011 |
| JP | 2013-98668 | 5/2013 |
| JP | 2016-5083 | 1/2016 |

* cited by examiner

FIG.3
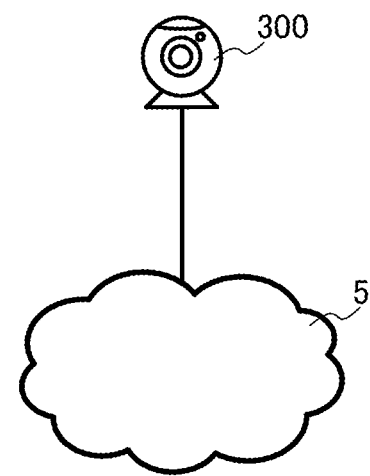
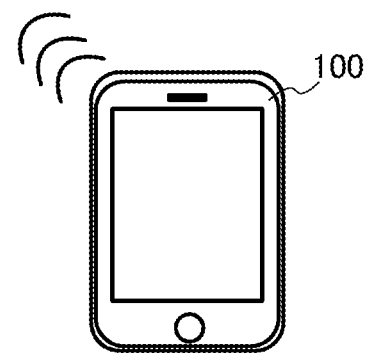

FIG.14

PERSONAL INFORMATION TABLE

| Person name | Phone number | Email address | SNS account |
|---|---|---|---|
| KEN | 090-1111-1111 | KEN@xxx.co.jp | ID:xxxx |
| RYU | 090-1111-2222 | RYU@xxx.co.jp | ID:yyyy |
| KEIKO | 090-1111-3333 | KEIKO@xxx.co.jp | ID:zzzz |

COMMUNICATION SYSTEM, COMMUNICATION METHOD, AND PROGRAM

TECHNICAL FIELD

The present invention relates to a system for communication, which is connected with a plurality of cameras through a network, and a method and a program for communication.

BACKGROUND ART

Recently, cameras set in various places have taken images such as moving image and still images, and the images have been displayed on an information terminal connected with these cameras through a network. The user of such an information terminal can specify an arbitrary place to display the images taken by the camera set in this place The constitution that displays a remote user image while the images taken by a camera are streaming to a terminal device in remote communication (refer to Patent Document 1).

CITATION LIST

Patent Literature

Patent Document 1: JP 2016-5083A

SUMMARY OF INVENTION

However, the constitution of Patent Document 1, which is capable to display images taken by a camera but hardly communicate with a person around this camera.

In view of the above-mentioned problems, an objective of the present invention is to provide a system, a method, and a program for communication, which are capable to easily select an image from a plurality of images and communicate with a person around the camera that takes the selected image.

The first aspect of the present invention provides a system for communication, the system being connected with a plurality of cameras through a network, including:

a display unit that displays images taken by the plurality of cameras;

an image selection unit that selects a desired image from the displayed images taken by the plurality of cameras; and a communication unit that communicates with a person around the camera corresponding to the selected image through a device attached to the camera.

According to the first aspect of the present invention, the system for communication, the system being connected with a plurality of cameras through a network displays images taken by the plurality of cameras, selects a desired image from the displayed images taken by the plurality of cameras, and communicates with a person around the camera corresponding to the selected image through a device attached to the camera.

The first aspect of the present invention is the category of a system for communication, but the category of a method or a program for communication has similar functions and effects.

The second aspect of the present invention provides a system for communication, the system being connected with a plurality of cameras through a network, including:

a display unit that displays images taken by the plurality of cameras;

an image selection unit that selects a desired image from the displayed images taken by the plurality of cameras;

an image recognition unit that identifies a person contained in the selected image by image recognition; and a communication unit that communicates with an information device used by the identified person.

According to the second aspect of the present invention, the system for communication, the system being connected with a plurality of cameras through a network displays images taken by the plurality of cameras, selects a desired image from the displayed images taken by the plurality of cameras, identifies a person contained in the selected image by image recognition, and communicates with an information device used by the identified person.

The second aspect of the present invention is the category of a system for communication, but the category of a method or a program for communication has similar functions and effects.

The third aspect of the present invention provides the system according to the first or the second aspect of the present invention, in which the display unit lists and displays images taken by the plurality of cameras.

According to the third aspect of the present invention, the system according to the first or the second aspect of the present invention lists and displays images taken by the plurality of cameras.

The fourth aspect of the present invention provides the system according to the first aspect of the present invention, in which the device attached to the camera is an acoustic instrument or a projection instrument, and the communication unit communicates through call or projection.

According to the fourth aspect of the present invention, the system according to the first aspect of the present invention, in which the device attached to the camera is an acoustic instrument or a projection instrument, communicates through call or projection.

The fifth aspect of the present invention provides the system according to the second aspect of the present invention, in which the communication unit communicates through call, email, or chat.

According to the fifth aspect of the present invention, the system according to the second aspect of the present invention communicates through call, email, or chat.

The sixth aspect of the present invention provides a method for communication, the method being executed by a system for communication, the system being connected with a plurality of cameras through a network, including the steps of;

displaying images taken by the plurality of cameras;

selecting a desired image from the displayed images taken by the plurality of cameras; and communicating with a person around the camera corresponding to the selected image through a device attached to the camera.

The seventh aspect of the present invention provides a method for communication, the method being executed by a system for communication, the system being connected with a plurality of cameras through a network, including the steps of;

displaying images taken by the plurality of cameras;

selecting a desired image from the displayed images taken by the plurality of cameras;

identifying a person contained in the selected image by image recognition; and communicating with an information device used by the identified person.

The eighth aspect of the present invention provides a program causing a system for communication, the system being connected with a plurality of cameras through a network, to execute the steps of;

displaying images taken by the plurality of cameras;

selecting a desired image from the displayed images taken by the plurality of cameras; and communicating with a person around the camera corresponding to the selected image through a device attached to the camera.

The ninth aspect of the present invention provides a program causing a system for communication, the system being connected with a plurality of cameras through a network, to execute the steps of;

displaying images taken by the plurality of cameras;

selecting a desired image from the displayed images taken by the plurality of cameras;

identifying a person contained in the selected image by image recognition; and communicating with an information device used by the identified person.

The present invention can provide a system, a method, and a program for communication that is capable to easily select an image from a plurality of images and communicate with a person around the camera that takes the selected image.

BRIEF DESCRIPTION OF DRAWINGS

FIG. 3 shows a diagram illustrating an overall configuration of the system for communication 1 according to the first embodiment.

FIG. 14 shows a personal information table stored in the operator terminal 100.

DESCRIPTION OF EMBODIMENTS

Embodiments of the present invention will be described below with reference to the attached drawings. However, these are illustrative only, and the scope of the present invention is not limited thereto.

Overview of System for Communication 1 According to First Embodiment

Figure 1:
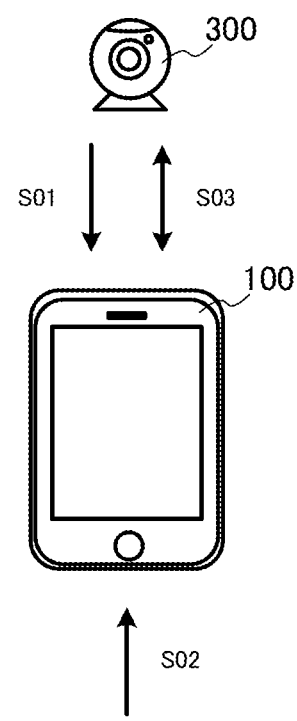
FIG. 1 shows a schematic diagram of the system for communication 1 according to the first embodiment.

The overview of a preferable first embodiment of the present invention will be described below with reference to FIG. 1. FIG. 1 shows a schematic diagram of the system for communication 1 according to a preferable first embodiment of the present invention. The system for communication 1 includes an operator terminal 100 and a plurality of cameras 300. Although FIG. 1 shows one of a plurality of cameras 300, this is illustrative only. The number of cameras can appropriately be changed. The number of the operation terminals 100 is not limited to one and may be two or more. The devices may be either existing devices or virtual devices, or the both. The process to be described later may be achieved by any one or both of the operator terminal 100 and the camera 300.

The operator terminal 100 is capable of data communication with the camera 300. Examples of the operator terminal 100 include electrical appliances such as a mobile phone, a mobile information terminal, a tablet terminal, a personal computer, a netbook terminal, a slate terminal, an electronic book terminal, and a portable music player.

The camera 300 is an imaging device that is capable to take an image such as a still or moving image and of data communication with the operator terminal 100. The camera 300 is equipped with an acoustic instrument or a projection instrument. The acoustic instrument and the projection instrument may be contained in the body of the camera 300 or attached to near the camera 300.

The operator terminal 100 receives input from the operator and acquires and displays an image taken by the camera 300 (Step S01). The camera 300 may take an image based on or not based on the input from the operator terminal 100. The operator terminal 100 may list and display the images acquired from a plurality of cameras 300, may list and display the images acquired from a plurality of cameras 300 that meet a certain condition, for example, the name of a person, a place, or a building, or may display an image from any one of a plurality of cameras 300 without listing.

The operator terminal 100 receives input from the operator to select an operator's desired image from the displayed images (Step S02).

The operator terminal 100 receives and transmits the camera 300 taking the selected image with voice data or image data and enables the operator to communicate with a person around the camera 300 (Step S03). When the operator and the person communicates with each other by voice, the operator terminal 100 receives voice input from the operator through the acoustic instruments such as a microphone and a speaker, and the camera 300 receives voice input from the person through the attached acoustic instruments. The operator terminal 100 and the camera 300 receive and transmit the voice data input to the operator terminal 100 and the camera 300, respectively, and output voice based on the voice data received by the acoustic instruments of the operator terminal 100 and the acoustic instruments attached to the camera 300, respectively. When the operator and the person communicates with each other by images, the operator terminal 100 takes an image of the operator with the imaging device of the operator terminal 100, and the camera 300 takes an image of the person. The operator terminal 100 and the camera 300 transmit and receive the respectively taken image data and output images based on the image data received by the display unit of the operator terminal 100 and the projection instrument, the display unit, etc., attached to the camera 300, respectively, System Configuration of System for Communication 1 According to First Embodiment The system configuration of the system for communication 1 according to the first embodiment will be described with reference to FIG. 3. FIG. 3 shows the system configuration of the system for communication 1 according to a preferable first embodiment of the present invention. The system for communication 1 includes an operator terminal 100, a plurality of cameras 300, and a public line network 5 (e.g. the Internet network, a third and a fourth generation networks). The number of the operation terminals 100 is not limited to one. Two or more operation terminals 100 may exist in the system. Although FIG. 3 shows one of a plurality of cameras 300, this is illustrative only. The devices may be either existing devices or virtual devices, or the both. The process to be described later may be achieved by any one or both of the operator terminal 100 and the camera 300.

The operator terminal 100 is the above-mentioned terminal device with the functions to be described later.

The camera 300 is the above-mentioned imaging device with the functions to be described later.

Functions

Figure 5:
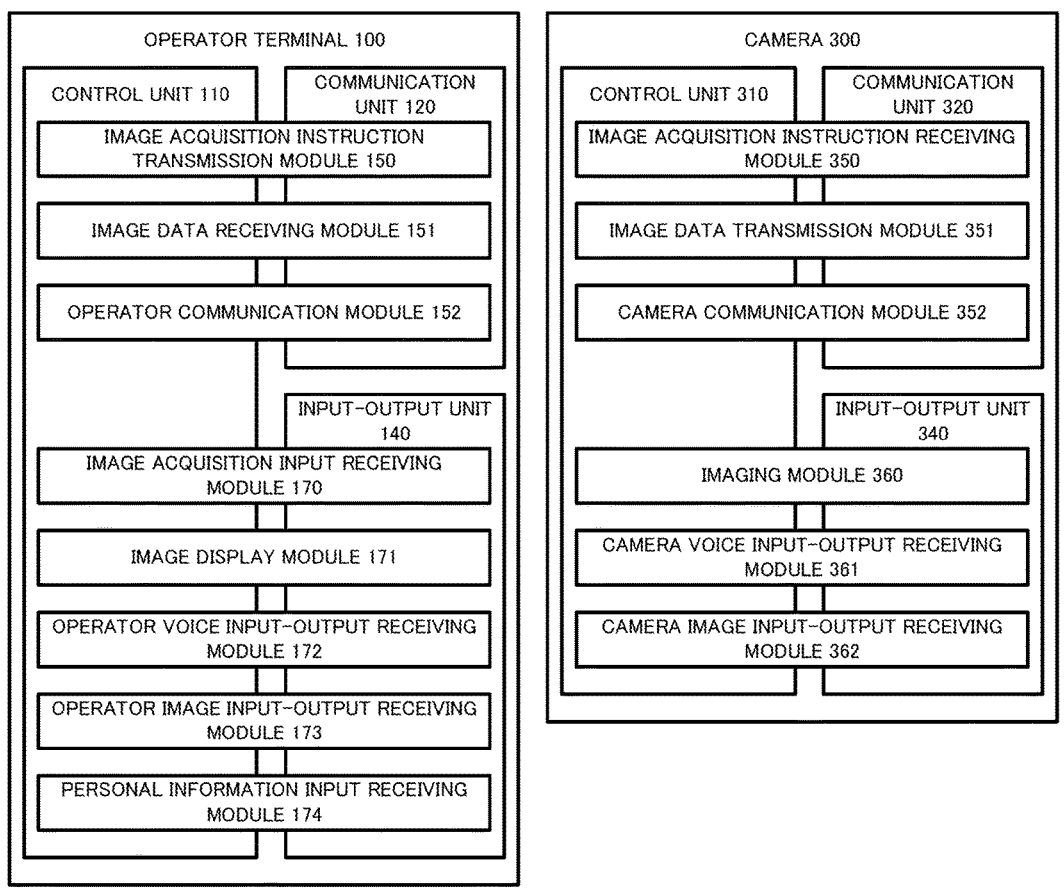
FIG. 5 shows a functional block diagram of the operator terminal 100 and the camera 300 in the first embodiment.

The functions of the system for communication 1 according to the first embodiment will be described with reference to FIG. 5. FIG. 5 shows a functional block diagram of the operator terminal 100 and the camera 300.

The operator terminal 100 may include a control unit 110 such as a central processing unit (hereinafter referred to as "CPU"), random access memory (hereinafter referred to as "RAM"), and read only memory (hereinafter referred to as "ROM") and a communication unit 120 such as a device capable of communicating with other devices, for example a Wireless Fidelity or Wi-Fi® enabled device complying with IEEE 802.11. The operator terminal 100 also includes a memory unit such as a hard disk, a semiconductor memory, a recording medium, or a memory card to store data. The operator terminal 100 also includes various devices such as a display unit that outputs and displays data and images processed by the control unit 110, an input unit such as a touch panel, a keyboard, or a mouse that receives input from the user, acoustic instruments such as a speaker and a microphone, and an imaging device such as a camera as the input-output unit 140.

In the operator terminal 100, the control unit 110 reads a predetermined program to achieve an image acquisition instruction transmission module 150, an image data receiving module 151, and an operator communication module 152 in cooperation with the communication unit 120. Furthermore, in the operation terminal 100, the control unit 110 reads a predetermined program to achieve an image acquisition input receiving module 170, an image display module 171, an operator voice input-output receiving module 172, an operator image input-output receiving module 173, and a personal information input receiving module 174 in cooperation with the input-output unit 140.

The camera 300 includes a control unit 310 including a CPU, a RAM, and a ROM; and a communication unit 320 such as a device that is capable to communicate with other devices, in the same way as the operator terminal 100. The camera 300 also includes imaging devices including an imaging element and a lens, acoustic instruments such as a speaker and a microphone, a projection instrument such as a projector, and a display unit that outputs and displays the data and the images that are controlled by the control unit 310 as the input-output unit 340. The acoustic instruments, the projection instrument, and the display unit may be contained in the body of the camera 300 or attached to near the camera 300.

In the camera 300, the control unit 310 reads a predetermined program to achieve an image acquisition instruction receiving module 350, an image data transmission module 351, and a camera communication module 352 in cooperation with the communication unit 320. Furthermore, in the camera 300, the control unit 310 reads a predetermined program to achieve an imaging module 360, a camera voice input-output receiving module 361, and a camera image input-output receiving module 362 in cooperation with the input-output unit 340.

Communication Process

Figure 7:
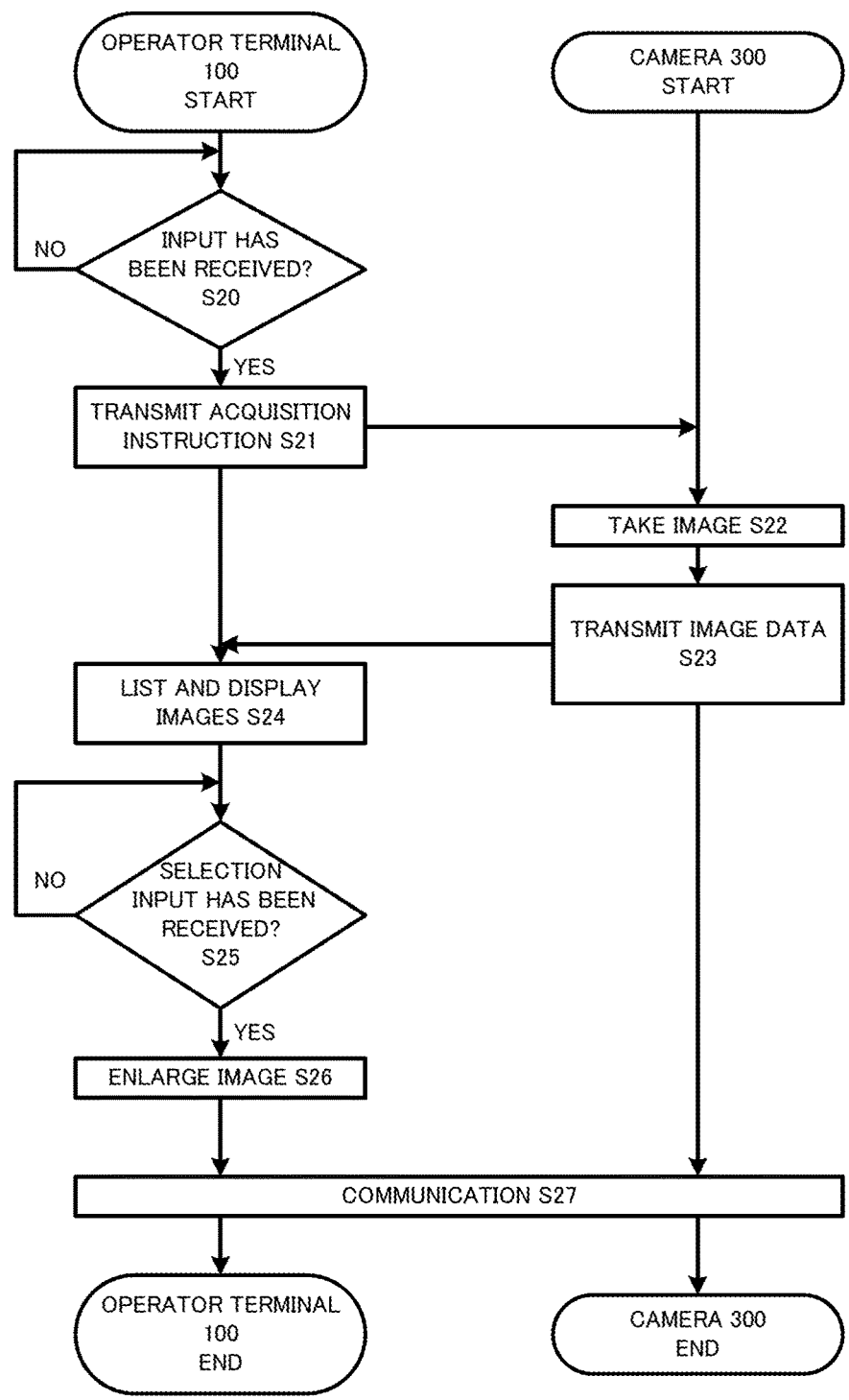
FIG. 7 shows a flow chart of the communication process performed by the operator terminal 100 and the camera 300 in the first embodiment.

The communication process performed by the operator terminal 100 and the camera 300 will be explained with reference to FIG. 7. FIG. 7 shows a flow chart of the communication process performed by the operator terminal 100 and the camera 300. The tasks executed by the modules of each of the above-mentioned devices will be explained below together with this process.

The image acquisition input receiving module 170 judges whether or not the image acquisition input receiving module 170 has received input from the operator (Step S20). In the step S20, for example, the image acquisition input receiving module 170 judges whether or not the operator has input an instruction to start a dedicated application or acquire an image from a dedicated website. In the step S20, if judging that the image acquisition input receiving module 170 has not received input (NO), the image acquisition input receiving module 170 repeats the process until receiving the input.

On the other hand, if judging that the image acquisition input receiving module 170 has received input (YES) in the step S20, the image acquisition instruction transmission module 150 transmits an instruction to a plurality of cameras 300 to acquire an image (Step S21)

The image acquisition instruction receiving module 350 receives the acquisition instruction transmitted from the operator terminal 100. The imaging module 360 takes an image such as a still or moving image of the location of the camera 300 based on the acquisition instruction (Step S22).

The image data transmission module 351 transmits image data indicating the image taken by the camera 300 to the operator terminal 100 (Step S23). In the step S23, the camera 300 may not take an image based on the acquisition instruction and may constantly take an image and transmit image data indicating the image taken by the camera 300 based on the acquisition instruction.

The image data receiving module 151 receives the image data transmitted from the camera 300. The image display module 171 lists and displays the images taken by a plurality of cameras 300 based on the received image data (Step S24).

In the step S24, the image display module 171 may list and display the images acquired taken by a plurality of cameras 300, may list and display the images acquired taken by a plurality of cameras 300 that meet a certain condition, or may display the images without listing. Examples of the certain condition include an image containing a person, an image taken by the camera 300 that is set at a location, the information of which is specified, and the image taken by the camera 300 to which acoustic instruments or a projection instrument is attached.

Figure 10:
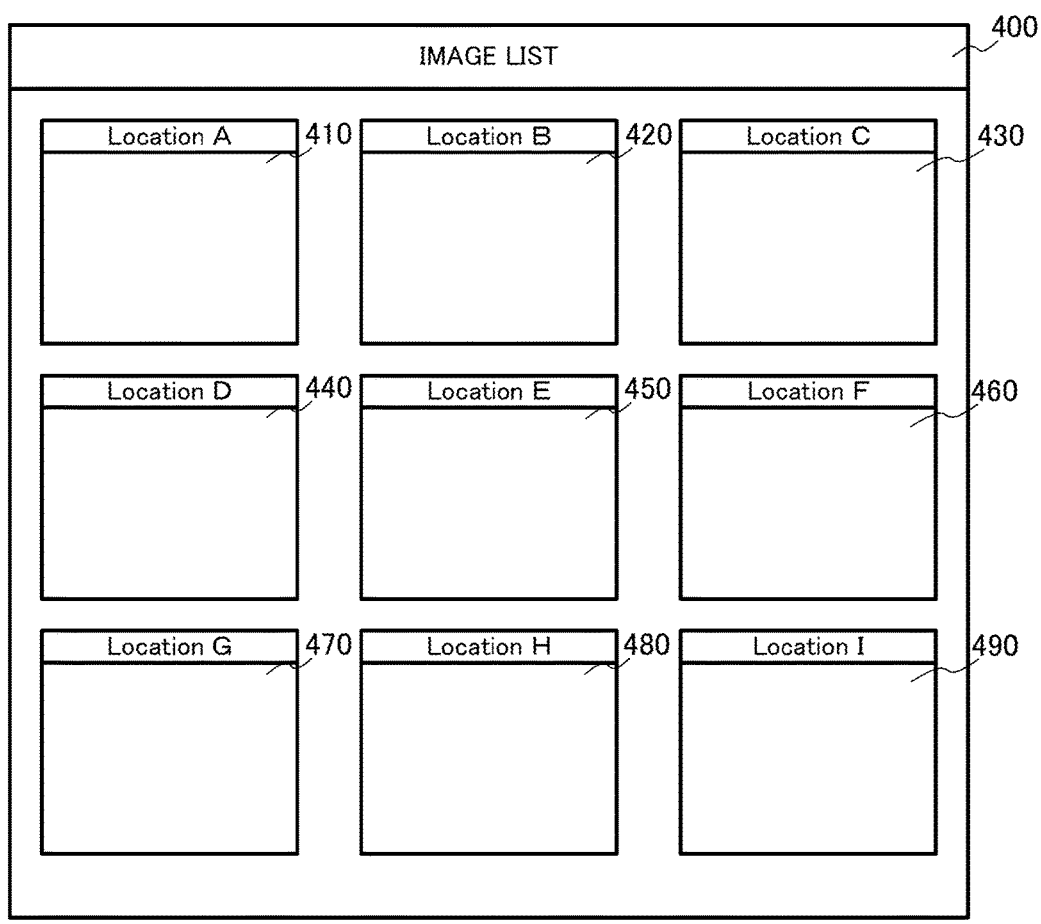
FIG. 10 shows an image list screen displayed on the operator terminal 100.

FIG. 10 shows one example of the image list screen displayed by the image display module 171. In FIG. 10, the image display module 171 displays a message display area 400 and image display areas 410 to 490 on the image list screen. The message display area 400 displays a notification to show that this screen lists the images taken by the cameras 300. The image display areas 410 to 490 display a notification to show that this screen displays the images taken by the cameras 300 at various places and their locations.

In FIG. 10, the number of the image display areas 410 to 490 displayed by the image display module 171 can be appropriately changed. The information displayed by the image display module 171 may be appropriately changed.

The image display module 171 receives input from the operator to select a desired image from the image display areas 410 to 490. If receiving the selection input, the image display module 171 enlarges the selected image.

The image display module 171 judges whether or not the image display module 171 has received input to select an image that the operator desires (Step S25). In the step S25, if judging that the image display module 171 has not received the selection input (NO), the image display module 171 repeats the process until receiving the input.

On the other hand, if judging that the image display module 171 has received the selection input (YES) in the step S25, the image display module 171 enlarges the selected image (Step S26).

Figure 11:
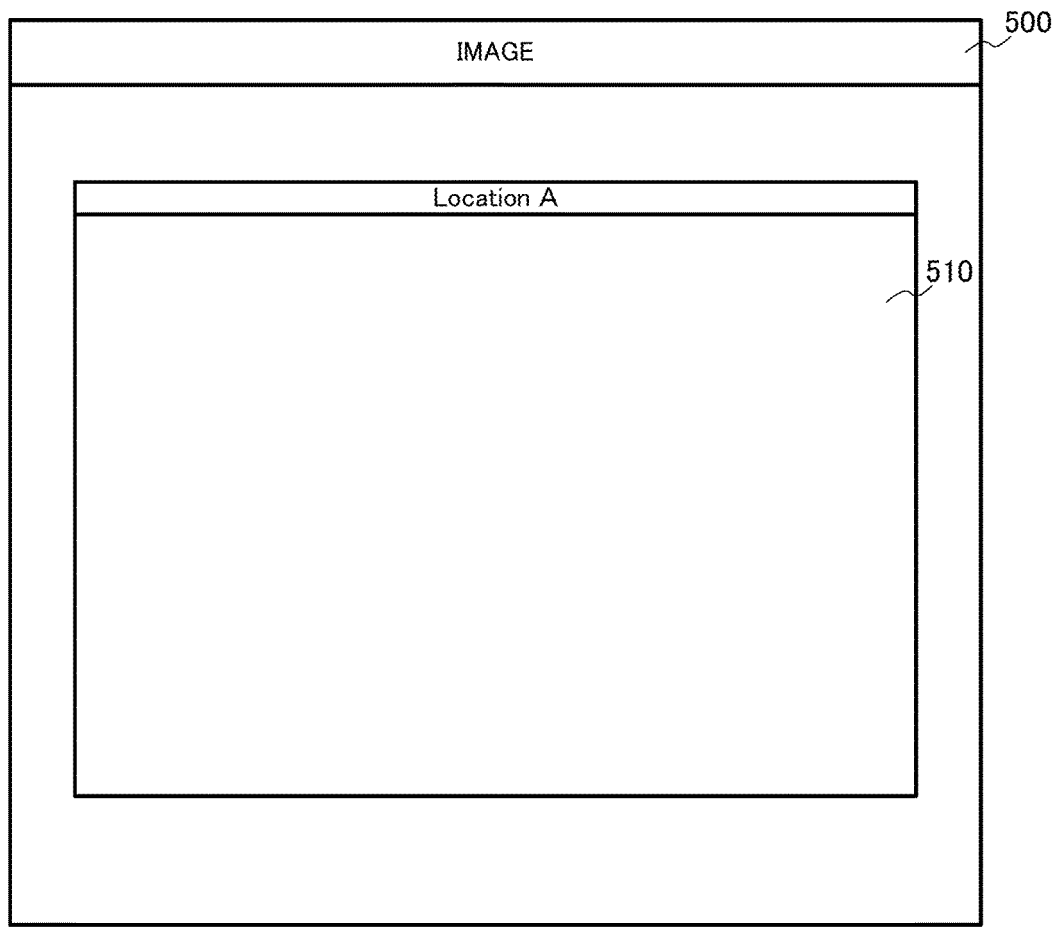
FIG. 11 shows an image screen displayed on the operator terminal 100.

FIG. 11 shows one example of the image screen displayed by the image display module 171. In FIG. 11, the image display module 171 displays a message display area 500 and an image display area 510 on the image screen. The message display area 500 displays a notification to show that this screen displays the image that the operator desires. The image display area 510 enlarges the selected image and displays a notification to shows the location of the camera 300 that took this image.

The image display module 171 may receive input to select an image from a plurality of images and enlarge or not enlarge the image.

The operator communication module 152 communicates with the camera communication module 352 (Step S27).

The communication process performed by the operator terminal 100 and the camera 300 by voice in the step S27 will be explained below. The operator voice input-output receiving module 172 receives voice input from the operator. The operator communication module 152 transmits the received voice to the camera 300 as operator voice data.

The camera communication module 352 receives the operator voice data. The camera voice input-output receiving module 361 outputs voice based on the received operator voice data and receives voice input from a person around the camera 300. The camera communication module 352 transmits the received voice to the operator terminal 100 as camera voice data.

For example, the camera voice input-output receiving module 361 receives the voice input of the person through the microphone and outputs operator's voice through the speaker. The operator voice input-output receiving module 172 receives the voice input from the operator through the microphone and outputs the voice of the person through the speaker.

The operator terminal 100 and the camera 300 enable the operator and the person to communicate with each other by transmitting and receiving operator voice data and camera voice data.

The communication process performed by the operator terminal 100 and the camera 300 by images in the step S27 will be explained below. The operator image input-output receiving module 173 takes an image of the operator. The operator communication module 152 transmits the image taken by the operator terminal 100 to the camera 300 as operator image data.

The camera communication module 352 receives the operator image data. The camera image input-output receiving module 362 outputs an image based on the received operator image data, and the image module 360 takes an image of a person around the camera 300. The camera communication module 352 transmits the image taken by the camera 300 to the operator terminal 100 as camera image data.

For example, the camera image input-output receiving module 362 projects the image of the operator to a wall, a ground, a screen, etc. with the projection instrument such as a projector, and the imaging module 360 takes the image of a person around the camera 300. The camera image input-output receiving module 362 may output an image of the operator to the display. The operator image input-output receiving module 173 outputs the image of the person and takes an image of the operator.

The operator terminal 100 and the camera 300 enable the operator and the person to communicate with each other by transmitting and receiving operator image data and camera image data.

The operator terminal 100 and the camera 300 may communicate with each other through both images and voices or by other methods.

Image Display Process

Figure 8:
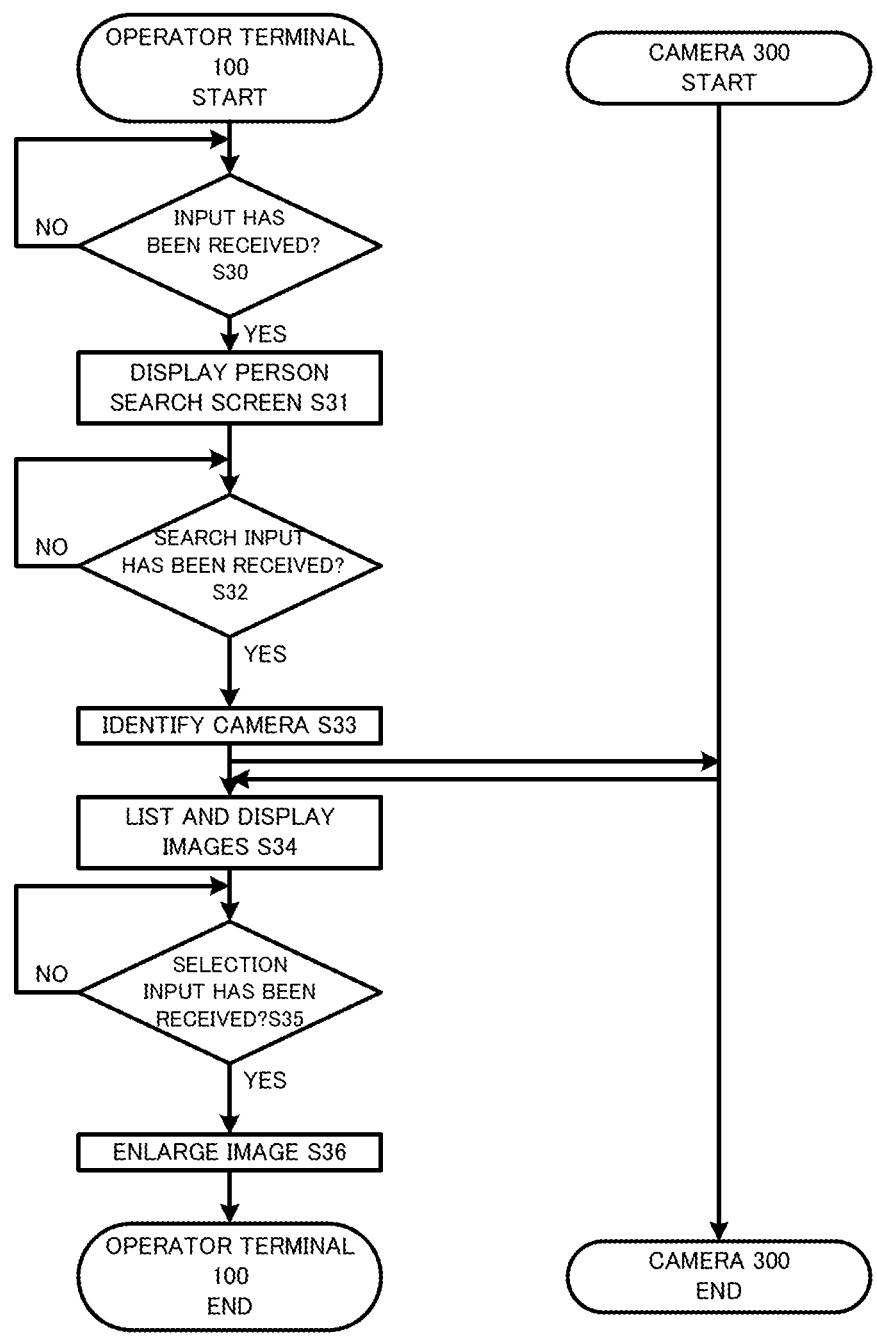
FIG. 8 shows a flow chart of the image display process performed by the operator terminal 100 and the camera 300 in the first embodiment.

The image display process performed by the operator terminal 100 and the camera 300 will be explained with reference to FIG. 8. FIG. 8 shows a flow chart of the image display process performed by the operator terminal 100 and the camera 300. The tasks executed by the modules of each of the above-mentioned devices will be explained below together with this process.

First, the personal information input receiving module 174 judges whether or not the personal information input receiving module 174 receives input of personal information on the person with whom the operator wishes to communicate (Step S30). In the step S30, for example, the personal information input receiving module 174 judges whether or not the operator has input an instruction to start a dedicated application or acquire an image from a dedicated website. In the step S30, if judging that the personal information input receiving module 174 has not received input (NO), the personal information input receiving module 174 repeats the process until receiving the input.

On the other hand, if judging that the personal information input receiving module 174 has received input (YES) in the step S30, the personal information input receiving module 174 displays the person search screen (Step S31).

Figure 12:
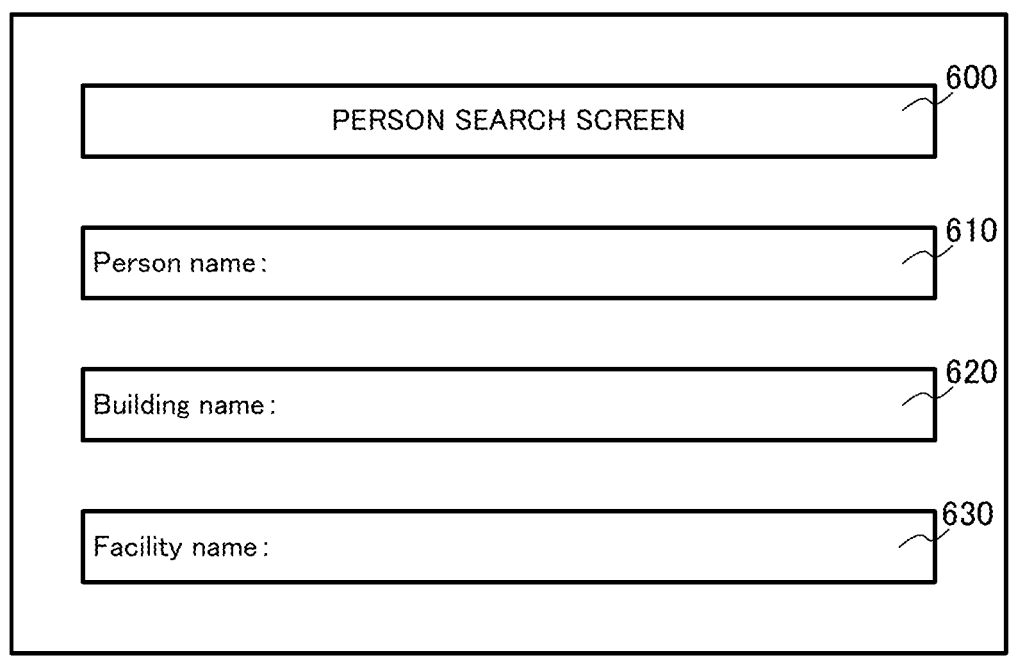
FIG. 12 shows a person search screen displayed on the operator terminal 100.

FIG. 12 shows a person search screen displayed by the personal information input receiving module 174. In FIG. 12, the personal information input receiving module 174 displays a message display area 600, a person name input area 610, a building name input area 620, and a facility name input area 630. The message display area 600 displays a notification to show that this screen receives input of personal information. The person name input area 610 receives input from the operator and receives input of a person name to be searched. The building name input area 620 receives input from the operator and receives input of a building name to be searched. The facility name input area 630 receives input from the operator and receives input of a facility name to be searched.

The personal information input receiving module 174 may receive other inputs or any one of the above-mentioned inputs.

The personal information input receiving module 174 judges whether or not the personal information input receiving module 174 has received search input (Step S32). In the step S32, if judging that the personal information input receiving module 174 has not received the search input (NO), the personal information input receiving module 174 repeats the process until receiving the input.

On the other hand, if judging that the personal information input receiving module 174 has received the search input (YES) in the step S32, the personal information input receiving module 174 receives input of any one or a combination of any two or more of the name of a person, a building, a facility, etc., and identifies the camera 300 that takes the image of the person, the building, the facility, etc (Step S33).

For example, the personal information input receiving module 174 identifies the camera 300 that takes the image of a person in the building or the facility that have searched based on a database, a table, etc., the operator terminal 100 performs the above-mentioned steps S20 to S24, and the image display module 171 displays the list of the images of the person from two or more directions (Step S34).

Figure 13:
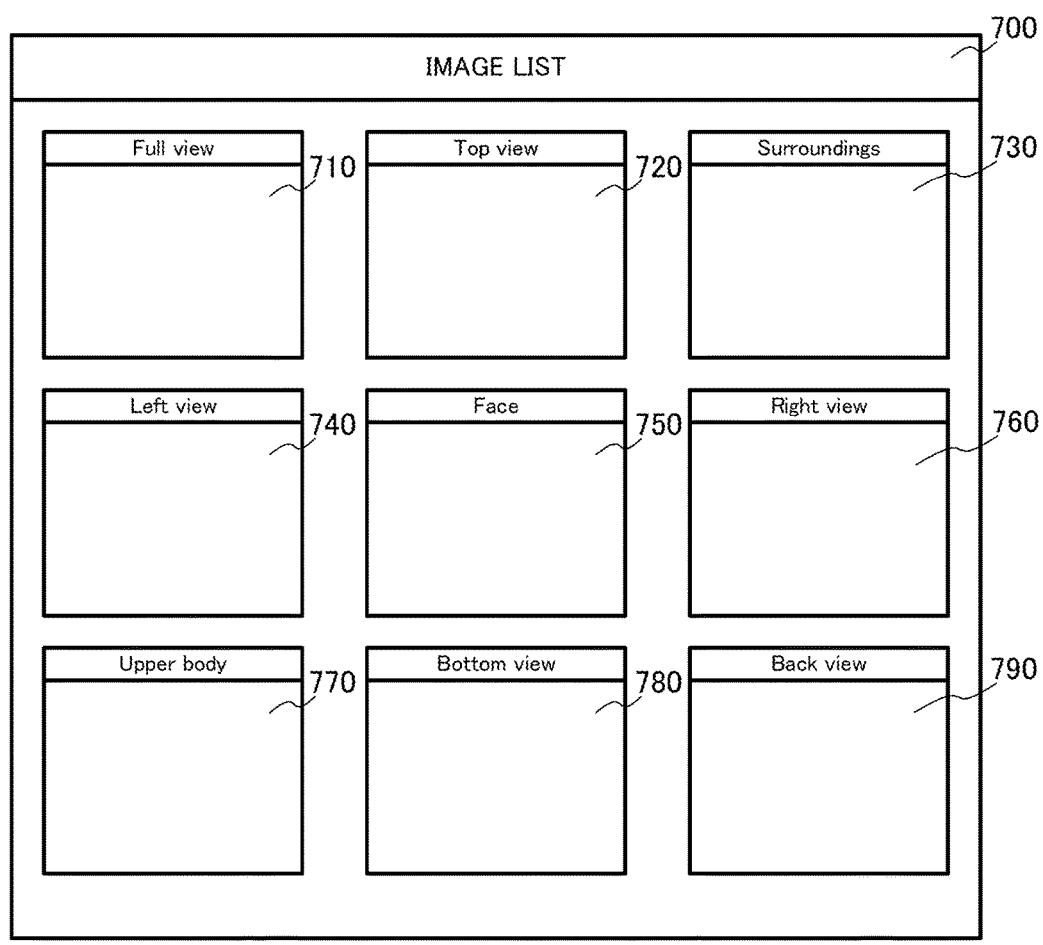
FIG. 13 shows an image list screen displayed on the operator terminal 100.

FIG. 13 shows one example of the image list screen displayed by the image display module 171. In FIG. 13, the image display module 171 displays a message display area 700 and image display areas 710 to 790. The message display area 700 displays a notification to show that this screen lists the images of the person that are taken from two or more directions. The image display areas 710 to 790 each display a notification to show the image of the person in a different direction and the imaging direction. In other words, the image display module 171 displays the image display areas 710 to 790 as many as possible.

In FIG. 13, the number of the image display areas 710 to 790 displayed by the image display module 171 can be appropriately changed. The information displayed by the image display module 171 may be appropriately changed.

The image display module 171 receives input from the operator to select a desired image from the image display areas 710 to 790. If receiving the selection input, the image display module 171 enlarges the selected image in the same way as the above-mentioned FIG. 11.

The image display module 171 judges whether or not the image display module 171 has received input of the operator's desired image (Step S35). In the step S35, if judging that the image display module 171 has not received the selection input (NO), the image display module 171 repeats the process until receiving the input.

On the other hand, if judging that the image display module 171 has received the selection input (YES) in the step S35, the image display module 171 enlarges the selected image (Step S36).

The operator terminal 100 and the camera 300 perform the above-mentioned step S27 to enable the operator and the person to communicate with each other.

The system for communication 1 according to the second embodiment will be described below.

Overview of System for Communication 1
According to the Second Embodiment

Figure 2:
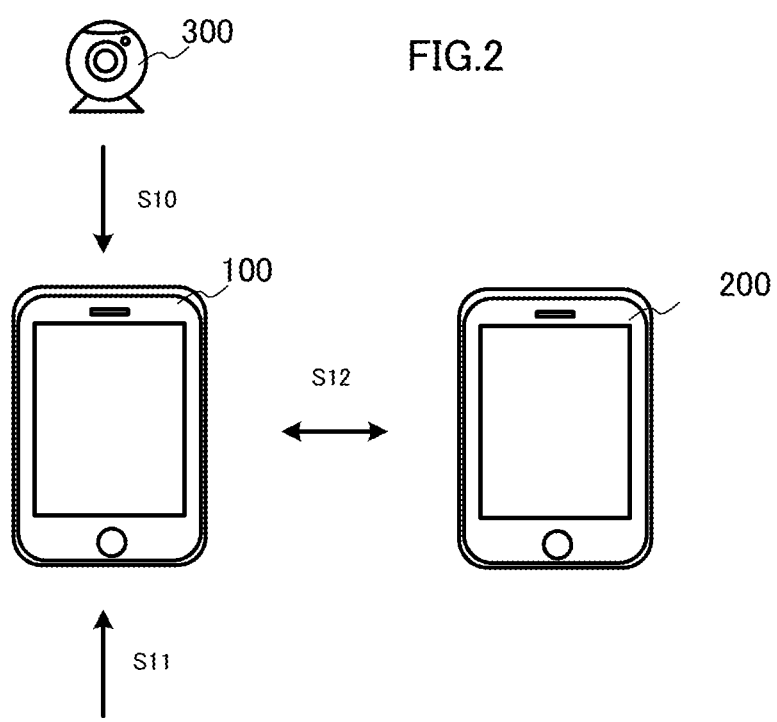
FIG. 2 shows a schematic diagram of the system for communication 1 according to the second embodiment.

The overview of a preferable second embodiment of the present invention will be described below with reference to FIG. 2. FIG. 2 shows a schematic diagram of the system for communication 1 according to a preferable second embodiment of the present invention. The system for communication 1 includes an operator terminal 100, an information device 200, and a plurality of cameras 300. The reference signs in the second embodiment are assigned to the same components as those of the above-mentioned first embodiment. The detailed explanation of the components is omitted. The number of the operation terminals 100 or the information devices 200 is not limited to one. Two or more operation terminals 100 or information devices 200 may exist in the system. Although FIG. 2 shows one of a plurality of cameras 300, this is illustrative only. The number of cameras can appropriately be changed. The devices may be either existing devices or virtual devices, or the both. The process to be described later may be achieved by any one or a combination of any two or more of the operator terminal 100, the information device 200, and the camera 300.

The operator terminal 100 is an information device described in the above-mentioned first embodiment, which is capable of data communication with the information device 200 and the camera 300.

The information device 200 is capable of data communication with the operator terminal 100. The examples of the information device 200 include electrical appliances in the same way as the operator terminal 100.

The camera 300 is an imaging device described in the above-mentioned first embodiment, which is capable of data communication with the operator terminal 100. The camera 300 may not be equipped with an acoustic instrument or a projection instrument.

The operator terminal 100 receives input from the operator and acquires and displays an image taken by the camera 300 (Step S10). The step S10 is processed in the same way as the above-mentioned step S01.

The operator terminal 100 receives input from the operator to select an operator's desired image from the displayed images (Step S11). The step S11 is processed in the same way as the above-mentioned step S02.

The operator terminal 100 recognizes the selected image and identifies a person contained this image. The operator terminal 100 identifies the information device 200 associated with the identified person. The operator terminal 100 acquires the phone number, the email address, the SNS account, etc., of the information device 200 associated with the identified person based on a database, a table, etc., and enables the operator to communicate with this person (Step S12). When the operator and the person communicates with each other by phone, the operator terminal 100 calls the acquired number, and the information device 200 receives the call to enable the operator and the person to talk with each other. When the operator and the person communicates with each other by email, the operator terminal 100 transmits email to the information device 200 based on the acquired email address, and the information device 200 receives the email and transmits email to the operator terminal 100 based on the email address of the operator terminal 100. When the operator and the person communicates with each other by SNS, the operator terminal 100 transmits a message, etc., to the SNS of the person based on the acquired SNS account, and the information device 200 receives the message and replies to the message, etc.

The operator terminal 100 and the information device 200 may enable the operator and the person to communicate with each other by chatting with each other by transmitting and receiving messages in real time. The operator and the person may communicate with each other by transmitting and receiving messages based on the acquired phone number or email address. The content of the communication between the operator and the person may be other than the above-mentioned examples.

Figure 4:
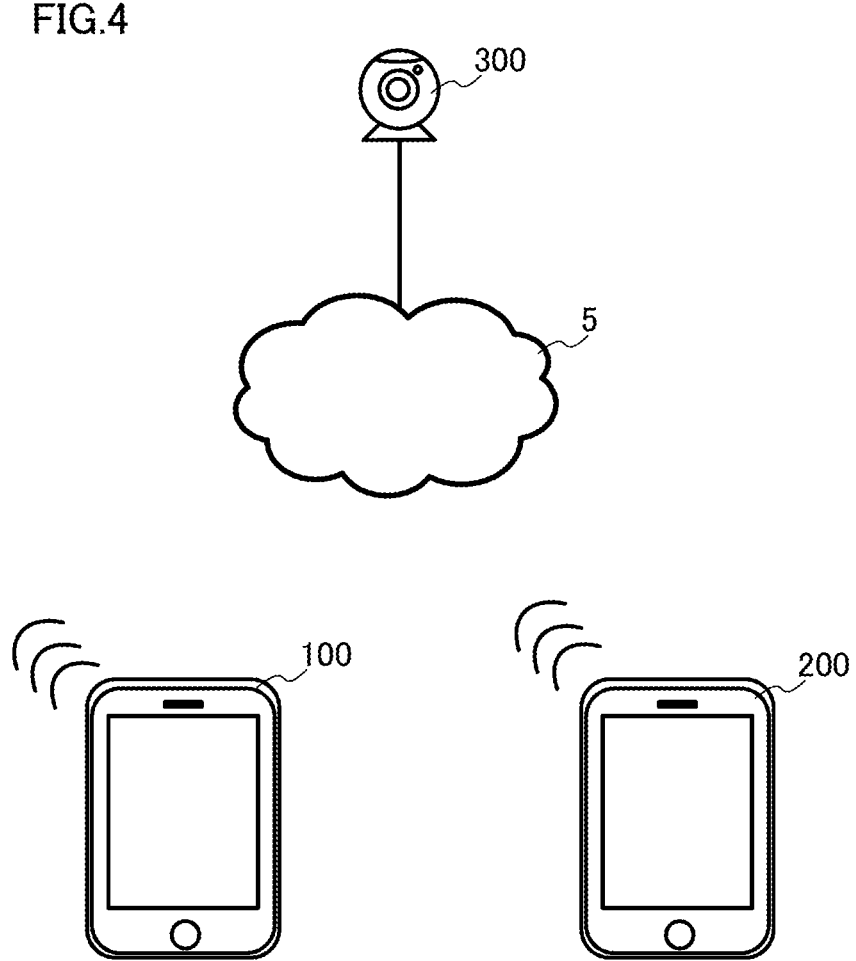
FIG. 4 shows a diagram illustrating an overall configuration of the system for communication 1 according to the second embodiment.

System Configuration of System for Communication 1 According to the Second Embodiment The system configuration of the system for communication 1 according to the second embodiment will be described with reference to FIG. 4. FIG. 4 shows the system configuration of the system for communication 1 according to a preferable second embodiment of the present invention. The system for communication 1 includes an operator terminal 100, an information device 200, a plurality of cameras 300, and a public line network 5. The reference signs in the second embodiment are assigned to the same components as those of the above-mentioned first embodiment. The detailed explanation of the components is omitted.

The operator terminal 100 is the above-mentioned terminal device with the functions to be described later.

The information terminal 200 is the above-mentioned terminal device with the functions to be described later.

The camera 300 is the above-mentioned imaging device with the functions to be described later.

Functions

Figure 6:
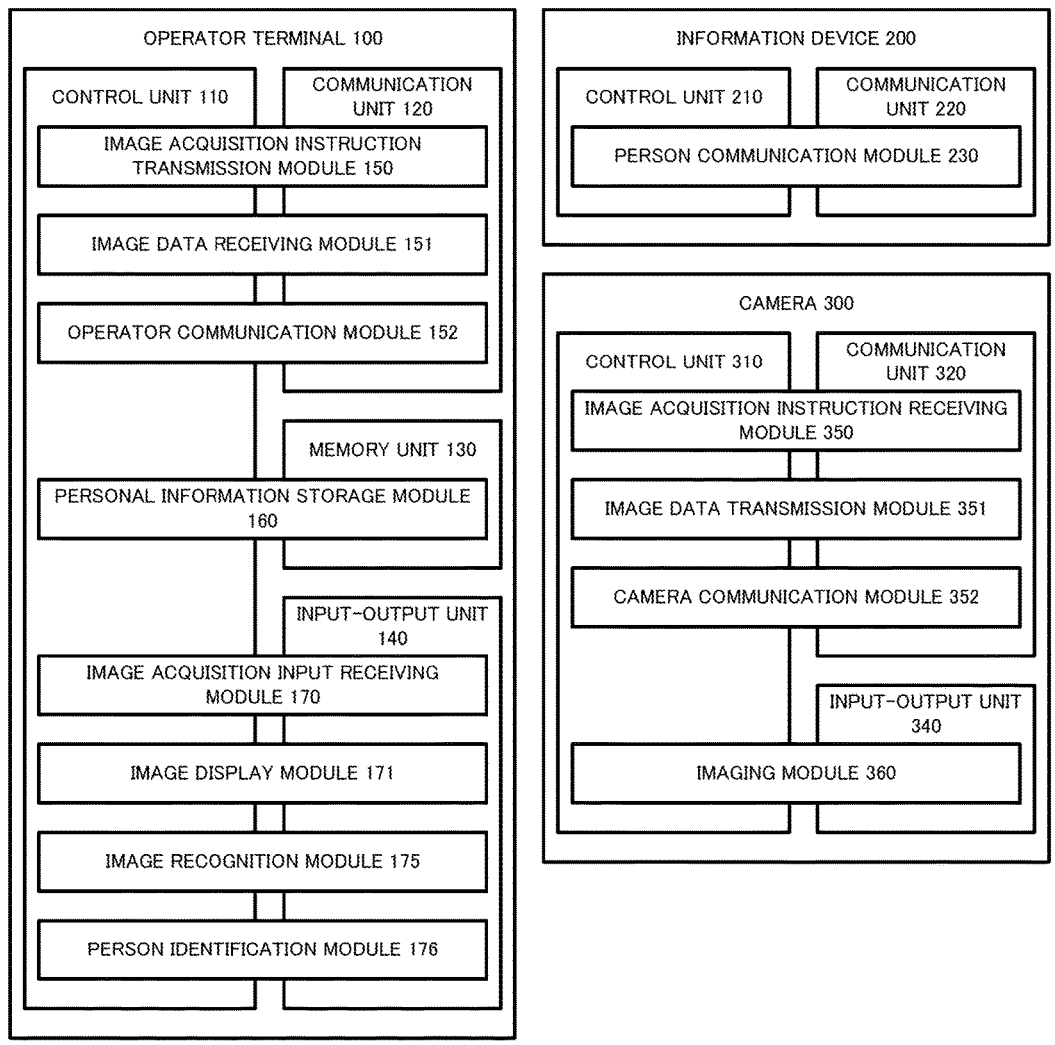
FIG. 6 shows a functional block diagram of the operator terminal 100, the information device 200, and the camera 300 in the second embodiment.

The functions of the system for communication 1 according to the second embodiment will be described with reference to FIG. 6. FIG. 6 shows a functional block diagram of the operator terminal 100, the information device 200, and the camera 300.

The operator terminal 100 includes a control unit 110, a communication unit 120, a memory unit 130, and an input-output unit 140 in the same way as the above-mentioned first embodiment.

In the operator terminal 100, the control unit 110 reads a predetermined program to achieve an image acquisition instruction transmission module 150, an image data receiving module 151, and an operator communication module 152 in cooperation with the communication unit 120. Furthermore, in the operator terminal 100, the control unit 110 reads a predetermined program to achieve a personal information storage module 160 in cooperation with the memory unit 130. Furthermore, in the operation terminal 100, the control unit 110 reads a predetermined program to achieve an image acquisition input receiving module 170, an image display module 171, an image recognition module 175, and a person identification module 176 in cooperation with the input-output unit 140.

The information device 200 includes a control unit 210 including a CPU, a RAM, and a ROM; and a communication unit 220 such as a device that is capable to communicate with other devices, in the same way as the operator terminal 100. The information device 200 also includes an input-output unit including a display unit, an input unit, an acoustic instrument, and an imaging device in the same way as the operator terminal 100.

In the information device 200, the control unit 210 reads a predetermined program to achieve a person communication module 230 in cooperation with the communication unit 220.

The camera 300 includes a control unit 310, a communication unit 320, and an input-output unit 340 in the same way as the above-mentioned first embodiment. The camera 300 may not be equipped with an acoustic instrument, a projection instrument, or a display unit.

In the camera 300, the control unit 310 reads a predetermined program to achieve an image acquisition instruction receiving module 350, an image data transmission module 351, and a camera communication module 352 in cooperation with the communication unit 320. Furthermore, in the camera 300, the control unit 310 reads a predetermined program to achieve an imaging module 360 in cooperation with the input-output unit 340.

Communication Process

Figure 9:
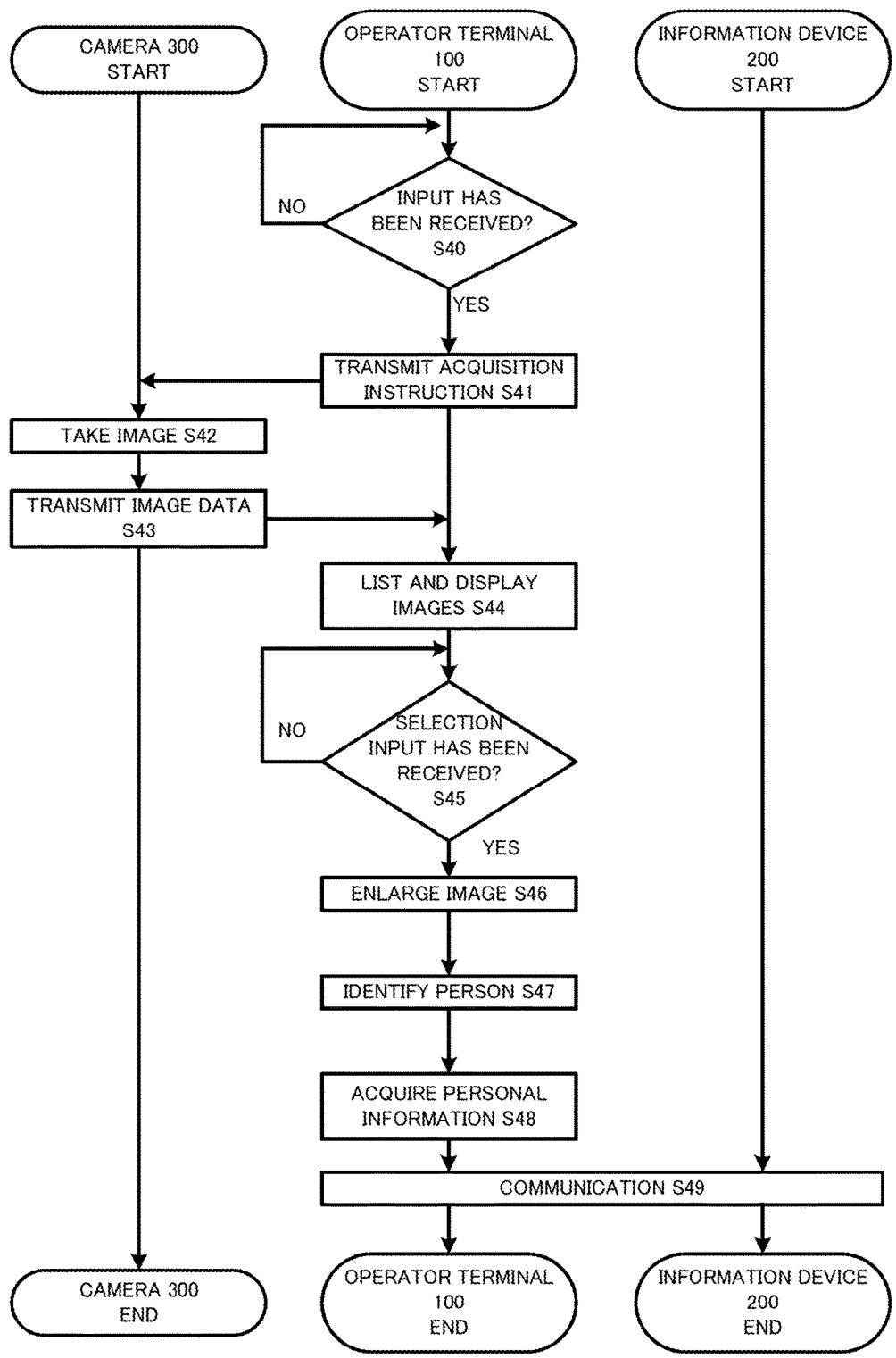
FIG. 9 shows a flow chart of the communication process performed by the operator terminal 100, the information device 200, and the camera 300 in the second embodiment.

The communication process performed by the operator terminal 100, the information device 200, and the camera 300 will be explained with reference to FIG. 9. FIG. 9 shows a flow chart of the communication process performed by the operator terminal 100, the information device 200, and the camera 300. The detailed explanation of the components is omitted.

The image acquisition input receiving module 170 judges whether or not the image acquisition input receiving module 170 has received input from the operator (Step S40). The step S40 is processed in the same way as the above-mentioned step S20.

In the step S40, if judging that the image acquisition input receiving module 170 has not received input (NO), the image acquisition input receiving module 170 repeats the process until receiving the input.

On the other hand, if judging that the image acquisition input receiving module 170 has received input (YES) in the step S40, the image acquisition instruction transmission module 150 transmits an instruction to a plurality of cameras 300 to acquire an image (Step S41). The step S41 is processed in the same way as the above-mentioned step S21.

The image acquisition instruction receiving module 350 receives the acquisition instruction transmitted from the operator terminal 100. The imaging module 360 takes an image of the location of the camera 300 based on the acquisition instruction (Step S42). The step S42 is processed in the same way as the above-mentioned step S22.

The image data transmission module 351 transmits image data indicating the image taken by the camera 300 to the operator terminal 100 (Step S43). The step S43 is processed in the same way as the above-mentioned step S23.

The image data receiving module 151 receives the image data transmitted from the camera 300. The image display module 171 lists and displays the images taken by a plurality of cameras 300 based on the received image data (Step S44). The step S44 is processed in the same way as the above-mentioned step S24.

The image display module 171 judges whether or not the image display module 171 has received input to select an image that the operator desires (Step S45). The step S45 is processed in the same way as the above-mentioned step S25.

In the step S45, if judging that the image display module 171 has not received the selection input (NO), the image display module 171 repeats the process until receiving the input.

On the other hand, if judging that the image display module 171 has received the selection input (YES) in the step S45, the image display module 171 enlarges the selected image (Step S46). The step S46 is processed in the same way as the above-mentioned step S26.

The image recognition module 175 recognizes the selected image and identifies a person contained this image (Step S47). The image recognition module 175 may perform general image recognition.

The person identification module 176 refers the personal information table stored in the personal information storage module 160, identifies the information device 200 associated with the identified person, and acquires personal information including the phone number, the email address, and the SNS account of the information device 200 (Step S48).

Personal Information Table

The personal information table will be described with reference to FIG. 14. FIG. 14 shows the personal information table stored in the personal information storage module 160. The personal information storage module 160 associates and stores a person name with a phone number, an email address, and an SNS account as personal information. The person name is name of a person. The phone number is of the information device 200 that a person uses. The email address is of the information device 200 that the person uses. The SNS account is the ID, etc., of a blog, a mini blog, an SNS application, or an SNS site. The personal information table may associate and store a person name with other information or may any one of the above-mentioned data. The number of the SNS accounts may be two or more each one person.

The operator communication module 152 communicates with the person communication module 230 by telecommunication or call based on the acquired personal information (Step S49).

The communication process performed by the operator terminal 100 and the information terminal 200 by call in the step S49 will be explained below. The operator communication module 152 calls the information device 200 based on the acquired phone number. The person communication module 230 receives this call and communicates with the operator terminal 100 and the information device 200 by talking through the phone.

The operator terminal 100 and the information terminal 200 enable the operator and the person to communicate with each other by talking through the phone.

The communication process performed by the operator terminal 100 and the information terminal 200 by email in the step S49 will be explained below. The operator communication module 152 transmits email to the information device 200 based on the acquired email address. The email may be input by the operator or may include previously defined sentences. The person communication module 230 receives email and transmits a reply to the received email. The email may be input by the person or may include previously defined sentences. The operator terminal 100 and the information device 200 may communicate with each other not only by transmitting and receiving email but also by chatting with each other by transmitting and receiving messages in real time.

The operator terminal 100 and the information device 200 enable the operator and the person to communicate with each other by transmitting and receiving email.

The communication process performed by the operator terminal 100 and the information device 200 by SNS in the step S49 will be explained below. The operator communication module 152 transmits writing information including a message, a chat, and a text to the corresponding SNS based on the acquired SNS account information. The person communication module 230 communicates with the operator terminal 100 and the information device 200 through SNS.

The operator terminal 100 and the information device 200 enable the operator and the person to communicate with each other by SNS.

The system for communication 1 according to the second embodiment performs a process similar to the image display process according to the above-mentioned first embodiment. In the second embodiment, the system for communication 1 performs the above-mentioned steps S30 to S36. The operator terminal 100 and the information device 200 used by a person to be searched performs the above-mentioned step S49 to enable the operator and the person to communicate with each other.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for communication
100 Operator terminal
200 Information device
300 Camera

What is claimed is:

1. A system for communication, the system being connected with a plurality of cameras through a network, comprising:
    an input unit that receives input of personal information on a person;
    a search unit that searches the plurality of cameras that take images of the person based on the received personal information;
    a display unit that displays images taken by the searched cameras;
    an image selection unit that selects a desired image from the displayed images taken by the plurality of cameras; and
    a communication unit that communicates with the person around a camera corresponding to the selected image through a device attached to the camera.

2. A system for communication, the system being connected with a plurality of cameras through a network, comprising:
    an input unit that receives input of personal information on a person;
    a search unit that searches the plurality of cameras that take images of the person based on the received personal information;
    a display unit that displays images taken by the searched cameras;
    an image selection unit that selects a desired image from the displayed images taken by the plurality of cameras; and
    a communication unit that communicates with an information device used by the person based on the personal information.

3. The system according to claim 1, wherein the display unit lists and displays images taken by the plurality of cameras.

4. The system according to claim 1, wherein the device attached to the camera is an acoustic instrument or a projection instrument, and the communication unit communicates through call or projection.

5. The system according to claim 2, wherein the communication unit communicates through call, email, or chat.

6. A method for communication, the method being executed by a system for communication, the system being connected with a plurality of cameras through a network, comprising the steps of:
receiving input of personal information on a person;
searching the plurality of cameras that take images of the person based on the received personal information;
displaying images taken by the searched cameras;
selecting a desired image from the displayed images taken by the plurality of cameras; and
communicating with the person around a camera corresponding to the selected image through a device attached to the camera.

7. A method for communication, the method being executed by a system for communication, the system being connected with a plurality of cameras through a network, comprising the steps of:
receiving input of personal information on a person;
searching the plurality of cameras that take images of the person based on the received personal information;
displaying images taken by the searched cameras;
selecting a desired image from the displayed images taken by the plurality of cameras; and
communicating with an information device used by the person based on the personal information.

8. A computer-readable recording medium that stores a program causing a system for communication, the system being connected with a plurality of cameras through a network, to execute the steps of:
receiving input of personal information on a person;
searching the plurality of cameras that take images of the person based on the received personal information;
displaying images taken by the searched cameras;
selecting a desired image from the displayed images taken by the plurality of cameras; and
communicating with the person around a camera corresponding to the selected image through a device attached to the camera.

9. A computer-readable recording medium that stores a program causing a system for communication, the system being connected with a plurality of cameras through a network, to execute the steps of:
receiving input of personal information on a person;
searching the plurality of cameras that take images of the person based on the received personal information;
displaying images taken by the searched cameras,
selecting a desired image from the displayed images taken by the plurality of cameras; and
communicating with an information device used by the person based on the personal information.

10. The system according to claim 2, wherein the display unit lists and displays images taken by the plurality of cameras.

11. The system according to claim 1, wherein the personal information includes at least one of a name of the person, a name of a building in which the person resides, and a name of a facility in which the person resides.

12. The system according to claim 2, wherein the personal information includes at least one of a name of the person, a name of a building in which the person resides, and a name of a facility in which the person resides.

13. The method according to claim 6, wherein the personal information includes at least one of a name of the person, a name of a building in which the person resides, and a name of a facility in which the person resides.

14. The method according to claim 7, wherein the personal information includes at least one of a name of the person, a name of a building in which the person resides, and a name of a facility in which the person resides.

15. The computer-readable recording medium according to claim 8, wherein the personal information includes at least one of a name of the person, a name of a building in which the person resides, and a name of a facility in which the person resides.

16. The computer-readable recording medium according to claim 9, wherein the personal information includes at least one of a name of the person, a name of a building in which the person resides, and a name of a facility in which the person resides.

* * * * *